(12) United States Patent
Shoseyov et al.

(10) Patent No.: US 9,464,142 B2
(45) Date of Patent: Oct. 11, 2016

(54) METHOD FOR PRODUCTION OF CELLULOSE NANO CRYSTALS FROM CELLULOSE-CONTAINING WASTE MATERIAL

(75) Inventors: Oded Shoseyov, Carmei Yosef (IL); Arnon Heyman, Gedera (IL); Shaul Lapidot, M.P. Shimshon (IL); Sigal Meirovitch, Tel Aviv (IL); Yuval Nevo, Rehovot (IL); Amit Rivkin, Rehovot (IL)

(73) Assignee: YISSUM RESEARCH DEVELOPMENT COMPANY OF THE HEBREW UNIVERSITY OF JERUSALEM LTD., Jerusalem (IL)

( * ) Notice: Subject to any disclaimer, the term of this patent is extended or adjusted under 35 U.S.C. 154(b) by 290 days.

(21) Appl. No.: 13/812,875

(22) PCT Filed: Jul. 28, 2011

(86) PCT No.: PCT/IL2011/000613
§ 371 (c)(1),
(2), (4) Date: Jan. 29, 2013

(87) PCT Pub. No.: WO2012/014213
PCT Pub. Date: Feb. 2, 2012

(65) Prior Publication Data
US 2013/0131332 A1    May 23, 2013

Related U.S. Application Data

(60) Provisional application No. 61/368,680, filed on Jul. 29, 2010.

(51) Int. Cl.
| | | |
|---|---|---|
| C08B 15/08 | (2006.01) | |
| C08B 37/00 | (2006.01) | |
| D21C 11/00 | (2006.01) | |

(52) U.S. Cl.
CPC ........... C08B 37/0003 (2013.01); C08B 15/08 (2013.01); D21C 11/0007 (2013.01); D21C 11/0085 (2013.01)

(58) Field of Classification Search
CPC .......................... C08B 15/08; C08B 37/0003
USPC ................................ 536/124, 56, 127, 128
See application file for complete search history.

(56) References Cited

U.S. PATENT DOCUMENTS

| | | |
|---|---|---|
| 1,528,218 A | 3/1925 | Leaver et al. |
| 4,060,684 A | 11/1977 | Monk |
| 4,291,007 A | 9/1981 | Baniel |
| 5,961,941 A | 10/1999 | Klyosov et al. |
| 8,398,901 B2 | 3/2013 | Beck et al. |
| 2010/0151159 A1 | 6/2010 | Beck et al. |
| 2011/0028710 A1 | 2/2011 | Baniel et al. |
| 2012/0244357 A1 | 9/2012 | Leung et al. |

FOREIGN PATENT DOCUMENTS

| | | |
|---|---|---|
| WO | 2010066029 A1 | 6/2010 |
| WO | 2011072365 A1 | 6/2011 |

OTHER PUBLICATIONS

Pokhrel, D., et al. "Treatment of pulp and paper mill wastewater—a review", Science of the Total Environment, 2004, pp. 37-58, 333, Elsevier B.V.
Azizi Samir, M.A., et al. "Review of Recent Research into Cellulosic Whiskers, Their Properties and Their Application in Nanocomposite Field", Biomacromolecules, 2005, pp. 612-626, 6, American Chemical Society.
Eyal, A., et al. "Extraction of Strong Mineral Acids by Organic Acid-Base Couples", Industrial & Engineering Chemistry Process Design and Development, 1982, pp. 334-337, 21, American Chemical Society.
Suntio, L.R., et al. "A Review of the Nature and Properties of Chemicals Present in Pulp Mill Effluents", Chemosphere, 1988, pp. 1249-1290, vol. 17, No. 7.
Paakko, M., et al., "Enzymatic Hydrolysis Combined with Mechanical Shearing and High-Pressure Homogenization for Nanoscale Cellulose Fibrils and Strong Gels", Biomacromolecules, 2007, pp. 1934-1941, 8, American Chemical Society.
International Search Report (ISR) published Feb. 2, 2012 for International Patent Application No. PCT/IL2011/000613 filed on Jul. 28, 2011.
International Preliminary Report on Patentability (IPRP) published Jan. 29, 2013 for International Patent Application No. PCT/IL2011/000613 filed on Jul. 28, 2011.
Written Opinion (WO) published Jan. 29, 2013 for International Patent Application No. PCT/IL2011/000813 filed on Jul. 28, 2011.
Ye Daiyong, "Preparation of Nanocellulose", vol. 19, No. 10, Oct. 2007, pp. 1-8, Progress in Chemistry.
Chinese Office Action for Application No. 201180046255.6, dated Apr. 3, 2015 and English translation.

*Primary Examiner* — Patrick Lewis
*Assistant Examiner* — Everett White
(74) *Attorney, Agent, or Firm* — Paul D. Bianco; Katharine Davis; Fleit Gibbons Gutman Bongini & Bianco PL

(57) ABSTRACT

A process is disclosed for recovering pure cellulose from a cellulose-containing sludge, the process comprising treating a sludge cellulose source under conditions permitting dissolution of non-cellulose material and suspension of the cellulose, wherein said dissolution conditions do not alter cellulose morphology.

20 Claims, No Drawings

METHOD FOR PRODUCTION OF CELLULOSE NANO CRYSTALS FROM CELLULOSE-CONTAINING WASTE MATERIAL

BACKGROUND OF THE INVENTION

Solid paper-mill waste residues amounting to thousands of tons per annum are usually disposed of in landfill sites creating a worldwide environmental problem. In addition, the use of recycled paper and its waste by-products increases the environmental implications of the paper manufacturing process. Removing the ink, clay, coatings and contaminants from waste paper in order to recover reusable cellulose fibers to produce recycled paper creates deinking sludge which in turn creates disposal problems. In addition, other non-cellulose by products obtained in the process of producing paper such as coatings, adhesives, dyes and fillers like calcium carbonate and clay wind up in the sludge creating an environmental problem and reducing the yield of cellulose production from paper mill waste.

In Europe only, eleven million tons of waste are produced yearly by the paper and wood industry (pulp and paper sludge), of which 70% originates from the production of deinked recycled paper. Wastes are very diverse in composition and consist of different types of sludge. In general, the paper sludge contains very high levels of dry solids because it is rich in fibers and therefore dewaters quite easily. All paper and wood waste (pulp, paper sludge, paper white and waste water) is a mixture of cellulose fibers (40-60% of dry solids), printing inks and mineral components (40-60% dry solids: kaolin, talc and calcium carbonate). The sludge from process water clarification is generated in the fiber recovery process from white waters and in the physical wastewater treatment process. It consists of mostly fines and fillers (both around 50%) depending on the recovered paper being processed [1,2]. A more extensive review on waste water characteristics is given by Pokhrel and Viraraghavan [3].

Thus, paper sludge disposal is a growing concern in the paper industry which is engaged in intensive research to develop alternative uses for waste paper sludge.

Due to legislation and increased taxes, landfills are eliminated as final destinations for wastes, and incineration with energy recovery is becoming the main waste recovery method. Other options such as pyrolysis, gasification, land spreading, composting and reuse as building material are being applied, although research and economic assessment is still needed for optimization of the processes [1]. Due to the large volumes of waste generated, the high moisture content of the waste and the changing waste composition as a result of process conditions, recovery methods are usually expensive and their environmental impact is still uncertain. For this reason, it is necessary to find alternatives and different applications of wastes, while taking into account the environmental and economic factors of these waste treatments. The second obstacle is the high amounts of acid required for the process.

Cellulose Whiskers also termed Nano Crystalline Cellulose (NCC) are fibers produced from cellulose under controlled conditions that lead to the formation of high-purity single crystals. They constitute a generic class of materials having mechanical strengths equivalent to the binding forces of adjacent atoms. The resultant highly ordered structure produces not only unusually high strengths but also significant changes in electrical, optical, magnetic, ferromagnetic, dielectric, conductive, and even superconductive properties.

The tensile strength properties of NCC are far above those of the current high volume content reinforcements and allow the processing of the highest attainable composite strengths. A review of the literature on NCC, their properties, and their possible use as a reinforcing phase in nanocomposite applications is given by Azizi et al [4].

One of the main obstacles in utilizing NCC in industrial applications is their relatively high price which is attributed mainly to the high energy that is needed to convert relatively large cellulose fibers and lignocellulose tissues to nano-scale fibers.

REFERENCES

[1] Monte, M. C., Fuente, E., Blanco, A., Negro, C., Waste management from pulp and paper production in the European Union. *Waste Management* 2009, 29, 293-308.
[2] Nemerow, N., Agardy, F., *Strategies of industrial and hazardous waste management*, Wiley 1998.
[3] Pokhrel, D., Viraraghavan, T., Treatment of pulp and paper mill wastewater—a review. *Science of the Total Environment* 2004, 333, 37-58.
[4] Azizi Samir, M. A. S., Alloin, F., Dufresne, A., Review of Recent Research into Cellulosic Whiskers, Their Properties and Their Application in Nanocomposite Field. *Biomacromolecules* 2005, 6, 612-626.
[5] Eyal, A., Baniel, A., Extraction of strong mineral acids by organic acid-base couples. *Industrial & Engineering Chemistry Process Design and Development* 1982, 21, 334-337.
[6] US patent 2011/0028710
[7] Leena R. et al., A Review of the Nature and Properties of Chemicals Present in Pulp Mill Effluents" CHEMOSPHERE Vol. 17, No. 7 (1988), pgs. 1249-1290.
[8] Paakko M, et al., 200. Biomacromolecules, 8, 1934-1941.

SUMMARY OF THE INVENTION

The inventors of the present invention have developed a process for using paper mill waste as a source for nanocellulose whiskers, also known as Nano Crystalline Cellulose (NCC). As the paper mill waste is typically discarded due to the high content of soluble and insoluble impurities, any use of the waste requires its prior purification. The process disclosed herein provides a cost and energy effective means for producing NCC and other valuable components that are recovered in the process, as will be disclosed hereinbelow.

Generally, the present invention provides a process for treating a cellulose containing sludge, such as a cellulose sludge from paper production plants, to recover (separate) therefrom pure cellulose (namely a cellulose containing less than 10% impurities, such as $CaCO_3$, calcium carbonate). Such cellulose is a suitable source for, e.g., producing NCC.

Thus, the present invention provides a process for recovering pure cellulose from a cellulose-containing sludge, e.g., paper sludge cellulose source, the process comprising treating the sludge cellulose source under conditions permitting dissolution of non-cellulose material and suspension of the cellulose. The cellulose which is collected may be further treated to produce NCC.

The pure cellulose recovered from a cellulose-containing sludge, or waste, is cellulose containing no more than 10% of impurities. The impurities may be any non-cellulose material which is present in the original sludge or waste material (the so-called "sludge cellulose source") or any such impurity which is generated in the recovery process. Depending on the source of the sludge or waste, the type and/or concentration of impurities may vary. For example, where the sludge is paper sludge containing cellulose, the main impurity may be calcium carbonate ($CaCO_3$) or any other calcium salt or calcium ions. In the recovery process of the invention, it is not necessary to remove all impurities as the purity of the cellulose which is recovered is sufficient for the further manipulation of the cellulose material, e.g., for the production of NCC. More of the impurities may be recovered or removed (discarded), depending, e.g., on the final intended application.

In some embodiments, the pure cellulose is 90% pure. In other embodiments, the cellulose is 91% pure. In further embodiments, the cellulose is 92% pure. Still, in some embodiments, the cellulose is 93% pure and further in other embodiments, the pure cellulose is 94% pure.

In further embodiments, the cellulose purity is between 95 and 99%. Thus, in some embodiments, the cellulose is 95% pure. In other embodiments, the cellulose is 96% pure. In other embodiments, the cellulose is 97% pure. In further embodiments, the cellulose is 98% pure. Still, in further embodiments, the cellulose recovered is 99% pure. In some embodiments, the cellulose purity is between 93 and 97% pure.

As used herein, the term "sludge cellulose source" refers to any cellulose-containing sludge or waste material from which separation of the cellulose is required or intended. Such sludge cellulose source may contain between 5% and about 60% of cellulose (based on the total amount of solid matter). In some embodiments, the sludge cellulose source is paper mill sludge. Within the context of the present invention, "paper sludge cellulose source", known also as "paper mill waste" or "paper mill sludge", refers to discharges from paper mills containing cellulose left-over that remains after paper and pulp are prepared. As recognized by the skilled artesian, the paper sludge cellulose source, may comprise between 250 and 300 chemicals, including dissolved organics, alcohols, turpenes, acetone, fatty acids, cellulose decomposition products, lignins and tannins, sulphides, mercaptans, resin-acids, soaps, chlorine, and caustic soda, among others [4,7].

Thus, in the context of the present invention, the sludge cellulose source refers to paper pulp, paper waste water (obtained after the cellulose pulp is filtered through a high mesh filter net) and to any cellulose source recycled from agricultural or industrial by-products, e.g., municipal sludge (containing around 4% solids out of which cellulose is around 30%, made up of toilet paper scraps, vegetable fibers etc), municipal sewage (containing around 4% solids of which cellulose is around 40%, dairy farms sludge and everything from wheat straw to sunflower stalks, and other agricultural cellulosic waste, scraps from the garment industry, or rags and cellulose discards recycled from other sources.

The paper sludge cellulose source typically comprises very high levels (40-60%) of dry solids, i.e., cellulose fibers and non-cellulose materials. The non-cellulose materials typically comprise (40-60%) a variety of solid and non-solid materials including printing inks and mineral components, such as kaolin, talc and calcium carbonate. The cellulose source employed by a process of the invention typically comprises between about 10% and about 40% by weight carbonaceous matter and between about 5% and about 30% by weight mineral matter (such as clay and calcium carbonate). This source may be further characterized by a high C/N ratio of about 50 to 200.

The sludge cellulose source may also contain a variety of solid materials, including wood barks, plastics, metals and others, depending on the composition of raw materials delivered to the production plant, e.g., paper production plant. These solid contaminants may be removed by a variety of mechanical separation techniques.

In some embodiments, the paper sludge cellulose source dry material contains between about 40% to about 60%, by weight, calcium carbonate and between about 40% to about 60%, by weight, of cellulose fibers.

In some embodiments, the paper sludge cellulose source dry material contains about 50%, by weight, calcium carbonate and about 50% by weight of cellulose fibers.

In some embodiments, the process allows the removal of between about 80% and about 99% by weight of calcium carbonate from the cellulose source. In other embodiments, between about 93% and 97% of calcium carbonate is removed. In further embodiments, about 95% of calcium carbonate is removed from the cellulose source.

In some embodiments, in the process of the invention, the sludge cellulose source is homogenized prior to affecting the conditions permitting dissolution of a non-cellulose material and suspension of the cellulose. Subsequent to homogenizing the paper sludge cellulose source, it is treated with a dilute acid to cause acidification of the non-cellulose materials (e.g., $CaCO_3$) and dissolution thereof in the aqueous medium, without substantially altering (affecting) the cellulose morphology, namely without substantially altering the molecular structure, domain distribution, domain arrangement, or domain constitution of amorphous and/or crystalline domains defining the cellulose material.

In some embodiments, the acidification is achievable by treating the sludge with a dilute acid having a concentration of between 0.1M and 1M acid. In further embodiments, the acid concentration is between 0.1M and 0.8M. In other embodiments, the acid concentration is between 0.1M and 0.6M. In further embodiments, the acid concentration is between 0.3M and 0.8M. In further embodiments, the acid concentration is between 0.3M and 0.6M. In further embodiments, the acid concentration is between 0.4M and 0.6M. In yet further embodiments, the acid concentration is between 0.1M and 0.3M.

The acid may be an organic or inorganic acid, which does not form water-insoluble salts with calcium carbonate. Non-limiting examples of such acids include HCl, HBr, $H_3PO_4$, and $HNO_3$, and natural acids such as citric acid, maleic acid, tartaric acid and others.

In some embodiments, the acid is selected from HCl, HBr, and natural acids, as defined.

In further embodiments, the acid is HCl. In further embodiments, the acid is HCl at a concentration of between 0.4M and 0.6M. In further embodiments, the acid is HCl at a concentration of between 0.1M and 0.3M.

The treatment of the paper sludge cellulose source under acidic conditions may be carried out at room temperature or at a higher temperature. In some embodiments, acidic treatment is carried out at a temperature below 100° C. In other embodiments, the acidic treatment is carried out at a temperature between 40° and 100° C. In other embodiments, the acidic treatment is carried out at a temperature between 40° and 80° C. In other embodiments, the acidic treatment is carried out at a temperature between 40° and 70° C. In other embodiments, the acidic treatment is carried out at a temperature between 40° and 60° C. In further embodiments, the acidic treatment is carried out at a temperature between 50° and 60° C.

In some embodiments, the paper sludge cellulose source is treated with HCl at a temperature between 40° C. and 80° C.

In further embodiments, the process of the invention comprises:
a) homogenizing a sludge cellulose source, such as paper sludge cellulose source, as defined herein;
b) treating (e.g., while stirring) said homogenized source under acidic conditions, e.g., HCl, allowing dissolution of the non-cellulose materials; said treatment does not alter the cellulose morphology (i.e., does not degrade the cellulose amorphous or crystalline domains); and
c) allowing the liquid phase containing the soluble non-cellulose material to separate from a solid phase containing cellulose (e.g., by centrifugation) and optionally washing the separated solid material with water; to thereby obtain pure cellulose (containing less than 5-10% impurities, such as calcium ions.

In some embodiments, after the acid treatment, the liquid phase (supernatant) is removed and a fresh volume of acid is introduced to wash the solid phase containing cellulose. This step may be repeated 2 or more times. In some embodiments, the step is repeated at least 3 times and at most 10 times. Thus, the process of the invention comprises:
a) homogenizing a sludge cellulose source, such as paper sludge cellulose source, as defined herein;
b) treating said homogenized source under acidic conditions, e.g., HCl, allowing dissolution of the non-cellulose material; said treatment does not alter the cellulose morphology (does not degrade the cellulose amorphous or crystalline domains);
c) repeating step b) at least twice; and
d) allowing the liquid phase containing the soluble non-cellulose material to separate from a solid phase containing cellulose (e.g., by decantation, filtering or centrifugation) and optionally washing the separated solid material with water; to thereby obtain pure cellulose (containing less than 5-10% impurities, such as calcium ions).

In some embodiments, the acid is added at a ratio of acid per gram of cellulose source of about 10-15 ml acid for each gram of a cellulose source.

The cellulose material separated from the acidic liquid phase may be collected dry, e.g., following filtration or centrifugation, and may be re-suspended prior to use, or may be collected as aqueous suspension and used as such.

In some embodiments, the process further comprises using the pure cellulose for preparing NCC. Thus, in accordance with such embodiments, the process of the invention comprises:
a) treating a sludge cellulose source, e.g., paper sludge cellulose source, to separate the pure cellulose, e.g., under the conditions disclosed above;
b) causing preferential (selective) degradation of cellulose amorphous domains while maintaining the cellulose crystalline domains intact (e.g., by acidification or by enzymatic degradation;
c) isolating the crystalline domains; and
d) dispersing the product obtained in step c) to obtain NCC (cellulose whiskers).

It is well known in the pertinent filed of the art that cellulose (e.g. natural plant cellulose) morphology may vary depending on its synthesis and source. In the cellulose fibers there are regions with high arrangement and molecular order of the cellulose chains that are tightly linked together by hydrogen bonding. The high arrangement results in high crystallinity. These areas are surrounded by areas where there is less arrangement and the cellulose chains are looser [8]. As recognized by the person of skill in the art, the physical properties of cellulose, as well as their chemical behavior and reactivity, are strongly influenced by the arrangement of the cellulose molecules (morphology) with respect to each other and to the fiber axis, as well. Thus, the term "cellulose amorphous domains" refers to regions in a cellulose material where there is less arrangement of cellulose fibers and the cellulose chains are looser. The term "cellulose crystalline domains" refers, in the context of the present invention to regions in a cellulose material characterized by high arrangement and molecular order of the cellulose chains that are tightly linked together by hydrogen bonding. The high arrangement results in high crystallinity.

In some embodiments, the preferential degradation of cellulose amorphous domains while maintaining the cellulose crystalline domains intact is achievable by acidification and/or by enzymatic treatment.

In some embodiments, the acidification to degrade the amorphous domains is carried out by treating the pure cellulose with an acid which is different from the acid used for the dissolution of the impurities or with the same acid but at a greater acid concentration.

The acid treatment is generally carried out under conditions of acid concentration, duration and temperature that allow preferential degradation of the amorphous domain of the cellulose. In some embodiments, such preferential or selective treatment is achieved when an aqueous acid solution is used at a concentration between about 20% and about 60% acid. In some embodiments, the acid concentration is between 20% and 50%, or between 40% and 60%, or between 50% and 60%. In additional embodiments, the concentration of the acid is between about 20% and about 50%. In further embodiments, the concentration of the acid is between about 30% and about 50%. In further embodiments, the concentration of the acid is between about 40% and about 50%. In still additional embodiments, the concentration of the acid is about 50%.

Clearly, the high acid concentration used to degrade the amorphous domains and thereby alter the morphology of the cellulose is much higher than the acid concentration used to dissolve the impurities in the recovery steps of cellulose from the sludge or waste, as disclosed hereinabove. The higher acid concentration permits also the dissolution (or decomposition) of additional impurities in the liquid medium and separation of highly pure NCC fibers.

In accordance with the process of the invention, the acid used to degrade the cellulose amorphous domains may be selected from a variety of acids, including organic or inorganic acids. Some non-limiting examples of acids that may be used to degrade the cellulose amorphous domains, in accordance with the present invention, are sulfuric hydrochloric acid, HCl, HBr, nitric acid and phosphoric acid.

In some embodiments, the acid is derived from one or more inorganic compound such as sulfuric acid, HCl, HBr and nitric acid.

In accordance with the present invention, when the cellulose is treated by acid (e.g. 50% $H_2SO_4$) said treatment may be carried out in water, preferably at a temperature of below 60° C., for a time period of time sufficient to destroy the amorphous domains.

In some embodiments, the acid is a recycled acid, obtained after the acidification of the cellulose amorphous regions (e.g., acid which about between 85% and 99% thereof is recovered and further used to treat subsequent batches of cellulose). The use of recycled acid in the destruction of the amorphous cellulose is an advantage of the method of the present invention since it recovers valuable components found in the paper waste including the cellulose whiskers.

In some embodiments, the mineral acid is recycled by the recovery procedure described by Eyal and Baniel [5,6], incorporated herein by reference. In accordance with this procedure, the mineral acid is extracted by organic acid/hydrophobic amine which is then converted to mineral acid and reused in the acidification chamber. Thus, in accordance with these embodiments, the mineral acid may be extracted and may then be recovered by backwashing of the extract phase with water concentrations approaching those in the original solutions. In one embodiment, the extractant comprises a strong organic acid and amine (both being water insoluble in their free acid or salt form) dissolved in a carrier solvent. The exact amine and organic acid are tested for their ability to form an extracting couple and their molar ratio is adjusted. For a detailed description of the process see U.S. Pat. No. 4,291,007, incorporated herein by reference. The recovered mineral acid is reused in the acidification step.

In other embodiments, the preferential degradation of cellulose amorphous domains is achievable by enzymatic treatment. In some embodiments, the cellulose amorphous domains are degraded using cellulase, an enzyme that catalyzes the hydrolysis of cellulose, under concentrations, duration and temperature that degrade only the cellulose amorphous domain and not the crystalline domain, as disclosed hereinabove.

In some embodiments, the concentration of cellulase used to degrade the cellulose amorphous domains is between 1 mili Unit to 1000 Units, the reaction temperature ranges from between about 4° C. to about 60° C. and the duration of the enzymatic reaction ranges from a few minutes (e.g., 2 minutes) to several hours (e.g., 5 hours).

In some embodiments, after the cellulose amorphous domains are degraded, the NCC are washed for several cycles in water and the remaining cellulose is separated (e.g., by centrifugation or nano-filtration).

In some embodiments, after the cellulose amorphous domains are degraded, the NCC are washed for several cycles in water the remaining cellulose is separated (e.g. by centrifugation or nano-filtration), dialyzed against water and sonicated and/or mechanically dispersed to produce dispersed NCC.

The invention also provides a process for the preparation of NCC from cellulose sludge (waste) source, the process comprising:
  a) treating a sludge cellulose source to separate pure cellulose therefrom;
  b) causing preferential degradation of cellulose amorphous domains while maintaining intact the cellulose crystalline domains;
  c) isolating the crystalline domains; and
  d) optionally dispersing the product obtained in step c) to obtain NCC.

The NCC obtained by this or any other process of the invention is in the form of fibers, 100-500 nm in length, and 10-20 nm in width.

In some embodiments, the pure cellulose is obtainable by a process according to the present invention. The process step a) may be carried out under acidic conditions. The process step b) may be carried out under acidic or enzymatic conditions. In some embodiments, the process steps a) and b) are each carried under acidic conditions, wherein the acidic conditions employed in step a) are different from the conditions employed in step b).

By virtue of the process of the invention, the sludge (waste) cellulose source may be used as a source for additional materials present in the sludge. Thus, the process of the invention comprises may comprise one or more process steps to separate such additional materials/compounds as sugar, Kaolin, Gypsum and $CaCl_2$. In accordance with these embodiments, sugar may be obtained by complete hydrolysis of the amorphous cellulose and other glucans that are present in the raw cellulose material; Kaolin may be recovered by sedimentation; Gypsum may be obtained by treating the reaction medium with sulfuric acid and $CaCl_2$ may be obtained by using hydrochloric acid.

DETAILED DESCRIPTION OF THE INVENTION

The present invention offers the possibility to use a raw material obtained from paper production such as bleached cellulose for the production of pure cellulose and also for the production of NCC. As known, in the paper making process, the cellulose pulp is filtered through a high mesh filter net. The resultant waste (the water filtered out from the pulp) contains very small cellulose fibers, and thus there is no need to invest much energy to reduce its size. By producing nano-crystals of cellulose from factory waste, an environmental problem is solved, with the production of valuable product(s).

The process of the present invention enables to obtain various valuable agents that may be isolated from the process: the hydrolyzed sugars may be fermented to produce bioethanol; for example water insoluble clay, such as kaolin, may be recovered by sedimentation; and calcium carbonate in the presence of acid releases $CO_2$ gas. The use of sulfuric acid brings about the formation of gypsum that may be recovered and utilized for construction (finish of walls and ceilings), as a fertilizer and soil conditioner etc. The usage of HCl results in the formation of $CaCl_2$ that may be used as brine for refrigeration plants, ice and dust control on roads, and in concrete.

Thus, the present invention provides a novel process for isolating pure cellulose from an environmentally contaminating source, which cellulose may be used in a great variety of applications including the production of NCC. These NCC may be used for many material applications, such as foams, films for paper reinforcement and packaging, medical applications (e.g., tissue engineering), food thickening and lubricants.

Example 1

Recovery of Pure Cellulose From Paper Sludge Cellulose Source

It is noted that if the procedure described hereinbelow is not performed, addition of sulfuric acid ($H_2SO_4$) for hydrolysis to the sludge result in immediate precipitation of gypsum ($CaSO_4.2H_2O$) in the same fraction as the cellulose. The gypsum rendered their selective isolation difficult. Cellulose fibers could not be isolated when an acid was used which produced water insoluble salts.

Thus, in order to achieve an effective separation of the cellulose fibers, the process was carried out as follows:
1. Sludge cellulose source was collected and the total solids content was measured.
2. Based on the cellulose source used, the material was optionally homogenized by Ultrathorax homogenizer 3. An acid, such as 0.5M HCl, was gradually added until gas evolution ceased.
4. The material was heated to 50-60° C. while stirring followed by centrifugation.
5. The supernatant was removed and fresh acid was added to wash the solid fraction. The cycle is repeated 3 times.
6. Following the 3$^{rd}$ acid treatment the acid was removed by centrifugation and the material was washed 3 times in deionized water to obtain a suspension of cellulose fibers.

Example 2

Protocol For Preparation of NCC (Cellulose Whiskers) From Paper Pulp Waste 1. 3.5 gr of cellulose obtained in accordance with Example 1 above, were suspended in 100 ml doubled distilled water (DDW) in a glass flask.
2. The flask was positioned in iced water bath while stirring
3. Concentrated $H_2SO_4$ was gradually added to a final concentration of 60%. The temperature was kept bellow 40° C.
4. The suspension was transferred to a 60° C. water bath and incubated while shaking for 30 min.
5. The product obtained from step (4) was centrifuged at 8000 rpm for 5 minutes; the acid was removed and re-suspended in 40 ml DDW.
6. The product obtained from step (5) was transferred to a 3,500 Da cutoff dialysis bag and dialyzed against DDW over night. The water was changed at least 4 times. The final pH of the solution was around 6.
7. The whiskers solution was sonicated in an ice bath until the solution became optically clear. A final honey-like viscosity was achieved after the suspension has cooled (usually takes a few hours).

The invention claimed is:

1. A process for manufacture of nanocrystalline cellulose (NCC) from cellulose recovered from a cellulose-containing sludge source that is untreated, the process comprising:
    treating the cellulose-containing sludge source with an acid selected from the group consisting of HCl, HBr, $H_3PO_4$, and $HNO_3$, the acid having a concentration between 0.1 M and 1 M under conditions that do not form water insoluble salts with calcium carbonate and under conditions enabling substantial dissolution of non-cellulose material and isolation of substantially pure cellulose, wherein the substantially pure cellulose has less than 10% impurities and wherein said dissolution conditions do not alter cellulose morphology; and
    treating the substantially pure cellulose with $H_2SO_4$ to a final acid concentration of about 60% under conditions causing preferential degradation of cellulose amorphous domains while maintaining cellulose crystalline domains intact, isolating the cellulose crystalline domains, and dispersing the isolated cellulose crystalline domains to obtain nanocrystalline cellulose (NCC).

2. The process according to claim 1, wherein said cellulose-containing sludge source contains between about 5% and about 60% cellulose, or between about 40% and about 60% cellulose.

3. The process according to claim 1, wherein said cellulose-containing sludge source is paper mill sludge.

4. The process according to claim 1, further comprising removal of about 95%, by weight, of calcium carbonate from the cellulose-containing sludge source.

5. The process according to claim 1, wherein the acid has a concentration between 0.1 M and 0.3 M.

6. The process according to claim 1, wherein said acid is HCl.

7. The process according to claim 6, wherein said conditions include treatment of said cellulose-containing sludge source with HCl at a temperature between 40° C. and 80° C.

8. The process according to claim 1,
    further comprising the steps of:
    a) homogenizing the cellulose-containing sludge source;
    b) treating said homogenized cellulose-containing sludge source under acidic conditions, enabling substantial dissolution of soluble non-cellulose materials without altering cellulose morphology; and
    c) separating a liquid phase containing the soluble non-cellulose material from a solid phase containing cellulose to thereby obtaining substantially pure cellulose.

9. The process according to claim 8, wherein steps b) and c) are repeated at least twice.

10. The process according to claim 9, further comprising the step of recovering the substantially pure cellulose by one of separating from an acidic liquid phase and subsequently drying and separating as an aqueous suspension.

11. The process according to claim 9, wherein step c) further comprises:
    washing the separated solid material with water.

12. The process according to claim 8, wherein step c) further comprises:
    washing the separated solid material with water.

13. The process according to claim 1, wherein subsequent to the degradation of the cellulose amorphous domains, the NCC are dispersed.

14. A process for preparation of nanocrystalline cellulose (NCC) from a cellulose-containing sludge source, the process comprising:
    a) treating the cellulose-containing sludge source according to claim 1 to separate therefrom substantially pure cellulose;
    b) causing preferential degradation of cellulose amorphous domains of the substantially pure cellulose while maintaining cellulose crystalline domains intact; and
    c) isolating the cellulose crystalline domains to thereby obtain NCC.

15. The process according to claim 14, wherein a product obtained from step c) is dispersed to thereby obtain NCC.

16. A process for producing nanocrystalline cellulose (NCC) from paper mill waste containing cellulose, the process comprising:
    a) providing the paper mill waste and measuring total solids content;
    b) separating soluble non-cellulose material from cellulose in the paper mill waste to obtain substantially pure cellulose, wherein the substantially pure cellulose has less than 10% impurities, the separating including:
       treating the paper mill waste with an acid having a concentration between 0.1 M and 1 M and selected from the group consisting of HCl, HBr, $H_3PO_4$, and $HNO_3$, wherein conditions of the treating enable substantial dissolution of the non-cellulose material, do not form water insoluble salts with calcium carbonate, and do alter cellulose morphology;
    c) treating the substantially pure cellulose obtained from step b) to obtain the NCC, the treating including:
       i) adding $H_2SO_4$ to the substantially pure cellulose to a final acid concentration of about 60%;
       ii) degrading cellulose amorphous domains and maintaining cellulose crystalline domains intact; and iii) isolating the cellulose crystalline domains; and
iii) dispersing the isolated cellulose crystalline domains to thereby obtain nanocrystalline cellulose (NCC).

17. The process according to claim 16, further comprising homogenizing the paper mill waste prior to carrying out step b).

18. The process according to claim 16, wherein the acid is HCl.

19. The process according to claim 16, further comprising washing the substantially pure cellulose with water obtained from step b) prior to carrying out step c).

20. The process according to claim 16, wherein steps b) and c) are repeated.

* * * * *